US005858957A

United States Patent [19]

Donoghue et al.

[11] Patent Number: 5,858,957

[45] Date of Patent: Jan. 12, 1999

[54] PROCESS FOR THE MANUFACTURE OF GRANULAR DETERGENT COMPOSITIONS COMPRISING NONIONIC SURFACTANT

[75] Inventors: Scott John Donoghue, Ixelles, Belgium; David John Smith, Newcastle-upon-Tyne, England

[73] Assignee: The Procter & Gamble Company, Cincinnati, Ohio

[21] Appl. No.: 875,257

[22] PCT Filed: Jan. 5, 1996

[86] PCT No.: PCT/US96/00527

§ 371 Date: Sep. 24, 1997

§ 102(e) Date: Sep. 24, 1997

[87] PCT Pub. No.: WO96/23048

PCT Pub. Date: Aug. 1, 1996

[30] Foreign Application Priority Data

| | | | |
|---|---|---|---|
| Jan. 26, 1995 | [EP] | European Pat. Off. | 95300490 |
| Mar. 14, 1995 | [EP] | European Pat. Off. | 95301692 |

[51] Int. Cl.[6] .............................. C11D 11/00; B29B 9/00

[52] U.S. Cl. .......................... 510/445; 510/456; 510/351; 510/356; 510/360; 510/361; 510/477; 510/495; 510/502; 264/8; 264/140

[58] Field of Search .................................... 510/445, 456, 510/351, 356, 360, 361, 477, 495, 502; 264/8, 140

[56] References Cited

U.S. PATENT DOCUMENTS

| | | | |
|---|---|---|---|
| 4,279,579 | 7/1981 | Froeschke | 425/6 |
| 4,484,952 | 11/1984 | Bes et al. | 106/308 Q |
| 4,889,643 | 12/1989 | Royce et al. | 252/8.8 |
| 4,927,557 | 5/1990 | Revis et al. | 510/513 |
| 5,002,681 | 3/1991 | Wierenga et al. | 510/297 |
| 5,013,498 | 5/1991 | Froeschke | 264/8 |
| 5,178,798 | 1/1993 | Jolicoeur | 510/441 |
| 5,366,652 | 11/1994 | Capeci et al. | 510/444 |
| 5,536,441 | 7/1996 | Chapple et al. | 252/186.33 |

FOREIGN PATENT DOCUMENTS

| | | |
|---|---|---|
| 0513824 | 11/1992 | European Pat. Off. . |
| 0622454 | 11/1994 | European Pat. Off. . |
| 0643130 | 3/1995 | European Pat. Off. . |
| 2026313 | 4/1992 | Spain . |

*Primary Examiner*—Douglas J. McGinty
*Assistant Examiner*—Lorna M. Douyon
*Attorney, Agent, or Firm*—Ian S. Robinson; Brian M. Bolam; Kim William Zerby

[57] ABSTRACT

A process for the manufacture of detergent compositions from a surfactant paste which is substantially in the solid phase at temperatures of 25° C. and below comprises the steps of: (i) mixing the surfactant paste at a temperature above its softening point, the surfactant paste comprising at least 50% by weight of nonionic surfactant; (ii) forming the molten surfactant paste into drops on a cooling surface; (iii) forming solid pastilles by cooling the drops of molten surfactant paste; and (iv) removing solidified pastilles from the cooling surface.

10 Claims, No Drawings

PROCESS FOR THE MANUFACTURE OF GRANULAR DETERGENT COMPOSITIONS COMPRISING NONIONIC SURFACTANT

The present invention relates to a process for the manufacture of detergent compositions or components from a surfactant paste which is rich in nonionic surfactant.

Nonionic surfactants are important components of current laundry detergent compositions. Present trends demand particulate components or compositions which have a high level of nonionic surfactant.

WO9206160, published on 16th Apr. 1992, discloses high performing nonionic surfactant systems based on mixtures of glucose amides and ethoxylated nonionic surfactants. In one example (example 20) a component is described which comprises a nonionic surfactant system which is a mixture of ethoxylated nonionic and N-methyl glucose amide in aqueous solution. The surfactant system is granulated in a high shear mixer in the presence of anionic surfactants and detergent powders. The total nonionic surfactant concentration of the finished granular detergent component is 26% by weight, and the anionic surfactant concentration is 21% by weight.

EP-A-643 130, published on Mar. 15, 1995, describes a granular laundry detergent having good physical characteristics, which delivers nonionic surfactants which have been selected for high performance in to the wash. Surfactant pastes are described which have a defined viscosity profile which enables high shear mixing and granulation processes to be performed in order to make granular detergent components having nonionic surfactant activities in excess of 50% by weight (in Example 9).

The present invention aims to provide a new and versatile process for an even wider range of nonionic surfactant rich pastes. This is achieved by:

(i) mixing the surfactant paste at a temperature above its softening point, the surfactant paste comprising at least 50% by weight of nonionic surfactants;

(ii) forming the molten surfactant paste into drops on a cooling surface;

(iii) forming pastilles by cooling and solidifying the drops of molten surfactant paste;

(iv) removing solidified pastilles from the cooling surface.

The process of the invention provides granular detergent components having nonionic surfactant activities in excess of 50% by weight which deliver high performing nonionic surfactants to the wash. The process places still fewer restrictions on the viscosity characteristics of surfactant pastes that are suitable for processing into granular detergent components than the processes of the prior art.

SUMMARY OF THE INVENTION

The invention relates to a process for the manufacture of detergent compositions or components from a surfactant paste which is substantially in the solid phase at temperatures of 25° C. and below, comprising the steps of:

(i) mixing the surfactant paste at a temperature above its softening point, the surfactant paste comprising at least 50% by weight of nonionic surfactant;

(ii) forming the molten surfactant paste into drops on a cooling surface;

(iii) forming solid pastilles by cooling the drops of molten surfactant paste; and (iv) removing solidified pastilles from the cooling surface.

In a preferred embodiment of the invention the surfactant paste further comprises anionic surfactant. In this embodiment the surfactant paste preferably comprises anionic surfactant and nonionic surfactant in a ratio of from 1:100 to 1:1, and furthermore, preferably has a water component of less than 15%, more preferably less than 10% by weight of the surfactant paste.

Suitable nonionic surfactants may be selected from the group consisting of ethoxylated nonionic surfactants, glycerol ethers, glucosamides, glycerol amides, glycerol esters, fatty acids, fatty acid esters, fatty amides, alkyl polyglucosides, alkyl polyglycol ethers, polyethylene glycols, ethoxylated alkyl phenols and mixtures thereof.

In particular a surfactant system comprising a mixture of polyhydroxy fatty acid amide and an ethoxylated nonionic surfactant in the ratio of from 3:7 to 7:3 is preferred.

In a particular embodiment of the invention, the molten surfactant paste is formed into drops by a continuous rotary drop former comprising outer and inner coaxial cylinders, both cylinders comprising a series of openings, at least one of the cylinders being rotatable. The molten surfactant drops are conveniently formed on a continuous steel cooling belt and, optionally, cooled by spraying a cooling liquid on to the opposite side of the belt to the side on which the drops are formed.

In a further aspect, the invention relates to granular detergent components or compositions comprising pastilles, the pastilles comprising at least 50% by weight of nonionic surfactant, characteristically have a generally rounded surface profile and at least one substantially planar surface.

An advantage of the process of the present invention is that the finished particles or "(micro)pastilles" have a very uniform and narrow particle size distribution and are substantially dust-free.

DETAILED DESCRIPTION OF THE INVENTION

The process defined herein is a "pastillation" or "micropastillation" process. "Pastilles" or "micropastilles" of granular laundry detergent components (or finished granular laundry detergent compositions) are formed by the solidification of molten droplets. A known drop forming device is described in DE 28 53 054, published on 12th Jun. 1980, owned by Sandvik Conveyor GmbH of Fellbach, Germany. The known device is a rotary drop former comprising outer and inner coaxial cylinders, the outer cylinder being rotatable, and the inner cylinder being stationary. The outer cylinder is perforated over its entire circumference, and those perforations periodically become aligned with a series of openings (or with a slit or a nozzle lip) formed in the inner cylinder. The melt contained inside the inner cylinder drips under pressure through the aligned openings.

In the known device, drops of the melt are formed directly onto a cooling belt to form on the belt a row of drops distributed adjacent to each other across the width of the belt. The drops thus formed on the cooling belt crystallise into solid pellets, or "(micro)pastilles".

It is preferred that the cooling belt is a continuous stainless steel conveyor belt. Most conveniently the cooling belt is cooled by spraying a cooling liquid on to the side of the belt opposite that on which droplets are formed. This enables any direct contact between the surfactant paste and the cooling liquid to be avoided.

After the "(micro)pastilles" are solidified they are removed from the belt, optionally with the aid of a scraper blade. Pastilles made by the process of the invention are generally recognisable by their surface profile which is generally round, but has a planar surface. The planar surface corresponds to the area of the pastille that has been in direct contact with the cooling belt.

In an alternative embodiment of the present invention the molten droplets may be formed and cooled on a rotating cooling drum, or on a surface such as a rotating disc. A suitable device is a Disc Pastillator for uniform free flowing pastilles manufactured by Goudsche Maschinefabriek B. V. of Waddinxveen, The Netherlands. Another device is described in their Dutch patent application NL-A-7 113 934.

In all of these devices outer surface of the droplet former and the cooling surface will normally move at the same linear speed so that substantially round uniform droplets are formed. However non-uniform droplets may be formed by driving the outer surface of the droplet former and the cooling surface at different linear speeds.

By cooling surface it is meant herein that the surface of the belt, drum, or disc is cooled by a cooling fluid such as water or air. The cooling fluid may be applied to the opposite surface of the belt, drum or disc to the surface on which the droplets are formed; on the cooling fluid may be applied to the same side as that on which the droplets are formed; or both surfaces at the same time.

In a further embodiment of the process, the cooling surface may optionally be heated locally in the region of the droplet formation. This improves the adhesiveness of the product to the belt.

The surfactant paste of the present invention may have a wide range of compositions as a result of the flexibility of the process of the invention. Suitable surfactant paste components are described below:

The term "surfactant paste" as used herein means a mixture of one or more surfactants comprising nonionic surfactants alone or a mixed anionic/nonionic surfactant system. Whilst other components such as water and solvents (e.g. short chain alcohols) may be present in the surfactant system, these will generally be minimised and preferably excluded.

The term "viscosity" as used herein means the viscosity measured at a shear rate of 25 $s^{-1}$. The viscosity can be measured by rotational analysis (e.g. a rheometer). Suitable instruments for these measurements are manufactured by Physica Messtechnik, Germany, (supplied by Thermo Instrument Systems of Breda, Netherlands).

The term "high active" as used herein refers to nonionic surfactant activities of at least 50%, preferably at least 60% by weight.

Surfactant Pastes

While any nonionic surfactant may be usefully employed in the present invention, two families of nonionics have been found to be particularly useful. These are nonionic surfactants based on alkoxylated (especially ethoxylated) alcohols, and those nonionic surfactants based on amidation products of fatty acid esters and N-alkyl polyhydroxy amine. The amidation products of the esters and the amines are generally referred to herein as polyhydroxy fatty acid amides. Particularly useful in the present invention are mixtures comprising two or more nonionic surfactacts wherein at least one nonionic surfactant is selected from each of the groups of alkoxylated alcohols and the polyhydroxy fatty acid amides.

Suitable nonionic surfactants include compounds produced by the condensation of alkylene oxide groups (hydrophilic in nature) with an organic hydrophobic compound, which may be aliphatic or alkyl aromatic in nature. The length of the polyoxyalkylene group which is condensed with any particular hydrophobic group can be readily adjusted to yield a water-soluble compound having the desired degree of balance between hydrophilic and hydrophobic elements.

Particularly preferred for use in the present invention are nonionic surfactants such as the polyethylene oxide condensates of alkyl phenols, e.g., the condensation products of alkyl phenols having an alkyl group containing from about 6 to 16 carbon atoms, in either a straight chain or branched chain configuration, with from about 4 to 25 moles of ethylene oxide per mole of alkyl phenol.

Preferred nonionics are the water-soluble condensation products of aliphatic alcohols containing from 8 to 22 carbon atoms, in either straight chain or branched configuration, with an average of up to 25 moles of ethylene oxide per more of alcohol. Particularly preferred are the condensation products of alcohols having an alkyl group containing from about 9 to 15 carbon atoms with from about 2 to 10 moles of ethylene oxide per mole of alcohol; and condensation products of propylene glycol with ethylene oxide. Most preferred are condensation products of alcohols having an alkyl group containing from about 12 to 15 carbon atoms with an average of about 3 moles of ethylene oxide per mole of alcohol.

It is a particularly preferred embodiment of the present invention that the nonionic surfactant paste also includes a polyhydroxy fatty acid amide component.

Polyhydroxy fatty acid amides may be produced by reacting a fatty acid ester and an N-alkyl polyhydroxy amine. The preferred amine for use in the present invention is N—(R1)-CH2(CH2OH)4-CH2-OH, where R1 is typically a alkyl, e.g. methyl group; and the preferred ester is a C12–C20 fatty acid methyl ester.

Methods of manufacturing polyhydroxy fatty acid amides have been described in WO 92 6073, published on 16th Apr. 1992. This application describes the preparation of polyhydroxy fatty acid amides in the presence of solvents. In a highly preferred embodiment of the invention N-methyl glucamine is reacted with a C12–C20 methyl ester. It also says that the formulator of granular detergent compositions may find it convenient to run the amidation reaction in the presence of solvents which comprise alkoxylated, especially ethoxylated (EO 3–8) C12–C14 alcohols (page 15, lines 22–27). This can directly yield nonionic surfactant pastes which are preferred in the present invention, such as those comprising N-methyl glucosamide and C12–C14 alcohols with an average of 3 ethoxylate groups per molecule.

Nonionic surfactant pastes, and granular detergents made from such pastes have been described in WO 92 6160, published on 16th Apr. 1992.

Both of these patent applications describe nonionic surfactant pastes together with suitable manufacturing processes for their synthesis, which have been found to be suitable for use in the present invention. However, for the purposes of the present invention is necessary to minimise (and preferably exclude) the presence of water (or other solvents).

The surfactant paste may also comprise anionic surfactants, indeed the inclusion of such surfactants may be of considerable advantage in order to improve the rate of solubility of the granular surfactant.

Anionic Surfactants

Nonlimiting examples of anionic surfactants useful herein include the conventional $C_{11}$–$C_{18}$ alkyl benzene sulfonates ("LAS") and primary, branched-chain and random $C_{10}$–$C_{20}$ alkyl sulfates ("AS"), the $C_{10}$–$C_{18}$ secondary (2,3) alkyl sulfates of the formula $CH_3(CH_2)_x(CHOSO_3\_M^+)CH_3$ and $CH_3(CH_2)_y(CHOSO_3\_M^+)\ CH_2CH_3$ where x and (y+1) are integers of at least about 7, preferably at least about 9, and M is a water-solubilizing cation, especially sodium, unsaturated sulfates such as oleyl sulfate, the $C_{10}$–$C_{18}$ alkyl alkoxy sulfates ("$AE_xS$"; especially EO 1–7 ethoxy sulfates), $C_{10}$–$C_{18}$ alkyl alkoxy carboxylates (especially the EO 1–5 ethoxycarboxylates), the $C_{10-18}$ glycerol ethers, the $C_{10}$–$C_{18}$ alkyl polyglycosides and their corresponding sulfated polyglycosides, the $C_{12}$–$C_{18}$ alpha-sulfonated fatty acid esters methyl ester sulphonate (MES), and oleoyl sarcosinates.

Other Surfactants

The laundry detergent compositions of the present invention may also contain cationic, ampholytic, zwitterionic, and semi-polar surfactants.

Cationic detersive surfactants suitable for use in the laundry detergent compositions of the present invention are those having one long-chain hydrocarbyl group. Examples of such cationic surfactants include the ammonium surfactants such as alkyldimethylammonium halogenides, and those surfactants having the formula:

$$[R^2(OR^3)y][R^4(OR^3)y]_2R^5N+X—$$

wherein R2 is an alkyl or alkyl benzyl group having from about 8 to about 18 carbon atoms in the alkyl chain, each $R^3$ is selected from the group consisting of $—CH_2CH_2—$, $—CH_2CH(CH_3)—$, $—CH_2CH(CH_2OH)—$, $—CH_2CH_2CH_2—$, and mixtures thereof; each $R^4$ is selected from the group consisting of $C_1$–$C_4$ alkyl, $C_1$–$C_4$ hydroxyalkyl, benzyl ring structures formed by joining the two $R^4$ groups, $—CH_2COH—CHOHCOR^6CHOHCH_2OH$ wherein $R^6$ is any hexose or hexose polymer having a molecular weight less than about 1000, and hydrogen when y is not 0; $R^5$ is the same as $R^4$ or is an alkyl chain wherein the total number of carbon atoms of $R^2$ plus $R^5$ is not more than about 18; each y is from 0 to about 10 and the sum of the y values is from 0 to about 15; and X is any compatible anion.

Other cationic surfactants useful herein are also described in U.S. Pat. No. 4,228,044, Cambre, issued Oct. 14, 1980, incorporated herein by reference.

When included therein, the laundry detergent compositions of the present invention typically comprise from 0% to about 25%, preferably form about 3% to about 15% by weight of such cationic surfactants.

Ampholytic surfactants are also suitable for use in the laundry detergent compositions of the present invention. These surfactants can be broadly described as aliphatic derivatives of secondary or tertiary amines, or aliphatic derivatives of heterocyclic secondary and tertiary amines in which the aliphatic radical can be straight- or branched chain. One of the aliphatic substituents contains at least 8 carbon atoms, typically from about 8 to about 18 carbon atoms, and at least one contains an anionic water-solubilizing group e.g. carboxy, sulfonate, sulfate. See U.S. Pat. No. 3,929,678 to Laughlin et al., issued Dec. 30, 1975 at column 19, lines 18–35 (herein incorporated by reference) for examples of ampholytic surfactants.

When included therein, the laundry detergent compositions of the present invention typically comprise form 0% to about 15%, preferably from about 1% to about 10% by weight of such ampholytic surfactants.

Zwitterionic surfactants are also suitable for use in laundry detergent compositions. These surfactants can be broadly described as derivatives of secondary and tertiary amines, derivates of heterocyclic secondary and tertiary amines, or derivatives of quaternary ammonium, quarternary phosphonium or tertiary sulfonium compounds. See U.S. Pat. No. 3,929,678 to Laughlin et al., issued Dec. 30, 1975 at columns 19, line 38 through column 22, line 48 (herein incorporated by reference) for examples of zwitterionic surfactants.

When included therein, the laundry detergent compositions of the present invention typically comprise form 0% to about 15%, preferably from about 1% to about 10% by weight of such zwitterionic surfactants.

Semi-polar nonionic surfactants are a special category of nonionic surfactants which include water-soluble amine oxides containing one alkyl moiety of from about 10 to about 18 carbon atoms and 2 moieties selected from the group consisting af alkyl groups and hydrocyalkyl groups containing form about 1 to about 3 carbon atoms; water-soluble phosphine oxides containing one alkyl moiety of form about 10 to about 18 carbon atoms and 2 moieties selected form the group consisting of alkyl groups and hydroxyalkyl groups containing from about 1 to about 3 carbon atoms.

Semi-polar nonionic detergent surfactants include the amine oxide surfactants having the formula:

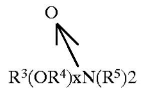

wherein $R^3$ is an alkyl, hydroxyalkyl, or alkyl phenyl group or mixtures thereof containing from about 8 to about 22 carbon atoms; $R^4$ is an alkylene or hydroxyalkylene group containing from about 2 to about 3 carbon atoms or mixtures thereof; x is form 0 to about 3; and each $R^5$ is an alkyl or hydroxyalkyl group containing form about 1 to about 3 carbon atoms or a polyethylene oxide group containing from about 1 to about 3 ethylene oxide groups. The $R^5$ groups can be attached to each other, e.g., through an oxygen or nitrogen atom, to form a ring structure.

There amine oxide surfactants in particular include $C_{10}$–$C_{18}$ alkyl dimenthyl amine oxides and $C_8$–$C_{12}$ alkoxy ethyl dihydroxy ethyl amine oxides.

When included therein, the laundry detergent compositions of the present invention typically comprise form 0% to about 15%, preferably from about 1% to about 10% by weight of such semi-polar nonionic surfactants.

Bleaching Compounds—Bleaching Agents and Bleach Activators

The detergent compositions herein may optionally contain bleaching agents or bleaching compositions containing a bleaching agent and one or more bleach activators. When present, bleaching agents will typically be at levels of from about 1% to about 30%, more typically from about 5% to about 20%, of the detergent composition, especially for fabric laundering. If present, the amount of bleach activators will typically be from about 0.1% to about 60%, more typically from about 0.5% to about 40% of the bleaching composition comprising the bleaching agent-plus-bleach activator.

The bleaching agents used herein can be any of the bleaching agents useful for detergent compositions in textile cleaning. These include oxygen bleaches as well as other bleaching agents. Perborate bleaches, e.g., sodium perborate (e.g., mono- or tetra-hydrate) can be used herein.

Another category of bleaching agent that can be used without restriction encompasses percarboxylic acid bleaching agents and salts thereof. Suitable examples of this class of agents include magnesium monoperoxyphthalate hexahydrate, the magnesium salt of metachloro perbenzoic acid, 4-nonylamino-4-oxoperoxybutyric acid and diperoxydodecanedioic acid. Such bleaching agents are disclosed in U.S. Pat. No. 4,483,781, Hartman, issued Nov. 20, 1984, U.S. patent application Ser. No. 740,446, Burns et al, filed Jun. 3, 1985, European Patent Application 0,133,354, Banks et al, published Feb. 20, 1985, and U.S. Pat. No. 4,412,934, Chung et al, issued Nov. 1, 1983. Highly preferred bleaching agents also include 6-nonylamino-6-oxoperoxycaproic acid as described in U.S. Pat. No. 4,634,551, issued Jan. 6, 1987 to Burns et al.

Peroxygen bleaching agents can also be used. Suitable peroxygen bleaching compounds include sodium carbonate peroxyhydrate and equivalent "percarbonate" bleaches, sodium pyrophosphate peroxyhydrate, urea peroxyhydrate, and sodium peroxide. Persulfate bleach (e.g., OXONE, manufactured commercially by DuPont) can also be used.

A preferred percarbonate bleach comprises dry particles having an average particle size in the range from about 500 micrometers to about 1,000 micrometers, not more than about 10% by weight of said particles being smaller than about 200 micrometers and not more than about 10% by weight of said particles being larger than about 1,250 micrometers. Optionally, the percarbonate can be coated with silicate, borate or water-soluble surfactants. Percarbonate is available from various commercial sources such as FMC, Solvay and Tokai Denka.

Mixtures of bleaching agents can also be used.

Peroxygen bleaching agents, the perborates, the percarbonates, etc., are preferably combined with bleach activators, which lead to the in situ production in aqueous solution (i.e., during the washing process) of the peroxy acid corresponding to the bleach activator. Various nonlimiting examples of activators are disclosed in U.S. Pat. No. 4,915, 854, issued Apr. 10, 1990 to Mao et al, and U.S. Pat. No. 4,412,934. The nonanoyloxybenzene sulfonate (NOBS) and tetraacetyl ethylene diamine (TAED) activators are typical, and mixtures thereof can also be used. See also U.S. Pat. No. 4,634,551 for other typical bleaches and activators useful herein.

Highly preferred amido-derived bleach activators are those of the formulae:

$$R^1N(R^5)C(O)R^2C(O)L \text{ or } R^1C(O)N(R^5)R^2C(O)L$$

wherein $R^1$ is an alkyl group containing from about 6 to about 12 carbon atoms, $R^2$ is an alkylene containing from 1 to about 6 carbon atoms, $R^5$ is H or alkyl, aryl, or alkaryl containing from about 1 to about 10 carbon atoms, and L is any suitable leaving group. A leaving group is any group that is displaced from the bleach activator as a consequence of the nucleophilic attack on the bleach activator by the perhydrolysis anion. A preferred leaving group is phenyl sulfonate.

Preferred examples of bleach activators of the above formulae include (6-octanamidocaproyl) oxybenzenesulfonate, (6-nonanamidocaproyl) oxybenzenesulfonate, (6-decanamidocaproyl) oxybenzenesulfonate, and mixtures thereof as described in U.S. Pat. No. 4,634,551, incorporated herein by reference.

Another class of bleach activators comprises the benzoxazin-type activators disclosed by Hodge et al in U.S. Pat. No. 4,966,723, issued Oct. 30, 1990, incorporated herein by reference. A highly preferred activator of the benzoxazin-type is:

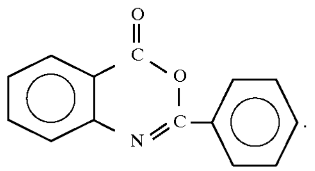

Still another class of preferred bleach activators includes the acyl lactam activators, especially acyl caprolactams and acyl valerolactams of the formulae:

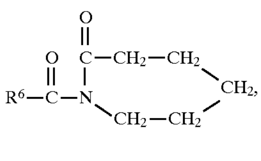
,
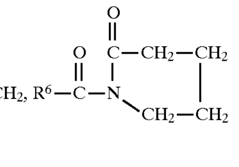

wherein $R^6$ is H or an alkyl, aryl, alkoxyaryl, or alkaryl group containing from 1 to about 12 carbon atoms. Highly preferred lactam activators include benzoyl caprolactam, octanoyl caprolactam, 3,5,5-trimethylhexanoyl caprolactam, nonanoyl caprolactam, decanoyl caprolactam, undecenoyl caprolactam, benzoyl valerolactam, octanoyl valerolactam, decanoyl valerolactam, undecenoyl valerolactam, nonanoyl valerolactam, 3,5,5-trimethylhexanoyl valerolactam and mixtures thereof. See also U.S. Pat. No. 4,545,784, issued to Sanderson, Oct. 8, 1985, incorporated herein by reference, which discloses acyl caprolactams, including benzoyl caprolactam, adsorbed into sodium perborate.

Bleaching agents other than oxygen bleaching agents are also known in the art and can be utilized herein. One type of non-oxygen bleaching agent of particular interest includes photoactivated bleaching agents such as the sulfonated zinc and/or aluminum phthalocyanines. See U.S. Pat. No. 4,033, 718, issued Jul. 5, 1977 to Holcombe et al. If used, detergent compositions will typically contain from about 0.025% to about 1.25%, by weight, of such bleaches, especially sulfonate zinc phthalocyanine.

If desired, the bleaching compounds can be catalyzed by means of a manganese compound. Such compounds are well known in the art and include, for example, the manganese-based catalysts disclosed in U.S. Pat. No. 5,246,621, U.S. Pat. No. 5,244,594; U.S. Pat. No. 5,194,416; U.S. Pat. No. 5,114,606; and European Pat. App. Pub. Nos. 549,271A1, 549,272A1, 544,440A2, and 544,490A1; Preferred examples of these catalysts include $Mn^{IV}_2(u\text{-}O)_3(1,4,7\text{-trimethyl-}1,4,7\text{-triazacyclononane})_2(PF_6)_2$, $Mn^{III}_2(u\text{-}O)_1(u\text{-}OAc)_2(1,4,7\text{-trimethyl-}1,4,7\text{-triazacyclononane})_2\text{-}(ClO_4)_2$, $Mn^{IV}_4(u\text{-}O)_6(1,4,7\text{-triazacyclononane})_4(ClO_4)_4$, $Mn^{III}Mn^{IV}_4(u\text{-}O)_1(u\text{-}OAc)_2\text{-}(1,4,7\text{-trimethyl-}1,4,7\text{-triazacyclononane})_2(ClO_4)_3$, $Mn^{IV}\text{-}(1,4,7\text{-trimethyl-}1,4,7\text{-triazacyclononane})\text{-}(OCH_3)_3(PF_6)$, and mixtures thereof. Other metal-based bleach catalysts include those disclosed in U.S. Pat. No. 4,430,243 and U.S. Pat. No. 5,114,611. The use of manganese with various complex ligands to enhance bleaching is also reported in the following United States Patents: U.S. Pat. Nos. 4,728,455; 5,284,944; 5,246,612; 5,256,779; 5,280,117; 5,274,147; 5,153,161; and 5,227,084.

Detergent builders/powders

Inorganic or P-containing detergent builders include, but are not limited to, the alkali metal, ammonium and alkanolammonium salts of polyphosphates (exemplified by the tripolyphosphates, pyrophosphates, and glassy polymeric meta-phosphates), phosphonates, phytic acid, silicates, carbonates (including bicarbonates and sesquicarbonates), sulphates, and aluminosilicates. However, non-phosphate builders are required in some locales. Importantly, the compositions herein function surprisingly well even in the presence of the so-called "weak" builders (as compared with phosphates) such as citrate, or in the so-called "underbuilt" situation that may occur with zeolite or layered silicate builders.

Examples of silicate builders are the alkali metal silicates, particularly those having a $SiO_2$:$Na_2O$ ratio in the range 1.6:1 to 3.2:1 and layered silicates, such as the layered sodium silicates described in U.S. Pat. No. 4,664,839, issued May 12, 1987 to H. P. Rieck. NaSKS-6 is the trademark for a crystalline layered silicate marketed by Hoechst (commonly abbreviated herein as "SKS-6"). Unlike zeolite builders, the Na SKS-6 silicate builder does not contain aluminum. NaSKS-6 has the delta-$Na_2SiO_5$ morphology form of layered silicate. It can be prepared by methods such as those described in German DE-A-3,417,649 and DE-A-3,742,043. SKS-6 is a highly preferred layered silicate for use herein, but other such layered silicates, such as those having the general formula $NaMSi_xO_{2x+1}.yH_2O$ wherein M is sodium or hydrogen, x is a number from 1.9 to 4, preferably 2, and y is a number from 0 to 20, preferably 0 can be used herein. Various other layered silicates from Hoechst include NaSKS-5, NaSKS-7 and NaSKS-11, as the alpha, beta and gamma forms. As noted above, the delta-$Na_2SiO_5$ (NaSKS-6 form) is most preferred for use herein. Other silicates may also be useful such as for example magnesium silicate, which can serve as a crispening agent in granular formulations, as a stabilizing agent for oxygen bleaches, and as a component of suds control systems.

Examples of carbonate builders are the alkaline earth and alkali metal carbonates as disclosed in German Patent Application No. 2,321,001 published on Nov. 15, 1973.

Aluminosilicate builders are useful in the present invention. Aluminosilicate builders are of great importance in most currently marketed heavy duty granular detergent compositions, and can also be a significant builder ingredient in liquid detergent formulations. Aluminosilicate builders include those having the empirical formula:

$$M_z(zAlO_2)_y].xH_2O$$

wherein z and y are integers of at least 6, the molar ratio of z to y is in the range from 1.0 to about 0.5, and x is an integer from about 15 to about 264.

Useful aluminosilicate ion exchange materials are commercially available. These aluminosilicates can be crystalline or amorphous in structure and can be naturally-occurring aluminosilicates or synthetically derived. A method for producing aluminosilicate ion exchange materials is disclosed in U.S. Pat. No. 3,985,669, Krummel, et al, issued Oct. 12, 1976. Preferred synthetic crystalline aluminosilicate ion exchange materials useful herein are available under the designations Zeolite A, Zeolite P (B), Zeolite MAP and Zeolite X. In an especially preferred embodiment, the crystalline aluminosilicate ion exchange material has the formula:

$$Na_{12}[(AlO_2)_{12}(SiO_2)_{12}].xH_2O$$

wherein x is from about 20 to about 30, especially about 27. This material is known as Zeolite A. Dehydrated zeolites (x=0–10) may also be used herein. Preferably, the aluminosilicate has a particle size of about 0.1–10 microns in diameter.

Organic detergent builders suitable for the purposes of the present invention include, but are not restricted to, a wide variety of polycarboxylate compounds. As used herein, "polycarboxylate" refers to compounds having a plurality of carboxylate groups, preferably at least 3 carboxylates. Polycarboxylate builder can generally be added to the composition in acid form, but can also be added in the form of a neutralized salt. When utilized in salt form, alkali metals, such as sodium, potassium, and lithium, or alkanolammonium salts are preferred.

Included among the polycarboxylate builders are a variety of categories of useful materials. One important category of polycarboxylate builders encompasses the ether polycarboxylates, including oxydisuccinate, as disclosed in Berg, U.S. Pat. No. 3,128,287, issued Apr. 7, 1964, and Lamberti et al, U.S. Pat. No. 3,635,830, issued Jan. 18, 1972. See also "TMS/TDS" builders of U.S. Pat. No. 4,663,071, issued to Bush et al, on May 5, 1987. Suitable ether polycarboxylates also include cyclic compounds, particularly alicyclic compounds, such as those described in U.S. Pat. Nos. 3,923,679; 3,835,163; 4,158,635; 4,120,874 and 4,102,903.

Other useful detergency builders include the ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Citrate builders, e.g., citric acid and soluble salts thereof (particularly sodium salt), are polycarboxylate builders of particular importance for heavy duty liquid detergent formulations due to their availability from renewable resources and their biodegradability. Citrates can also be used in granular compositions, especially in combination with zeolite and/or layered silicate builders. Oxydisuccinates are also especially useful in such compositions and combinations.

Also suitable in the detergent compositions of the present invention are the 3,3-dicarboxy-4-oxa-1,6-hexanedioates and the related compounds disclosed in U.S. Pat. No. 4,566,984, Bush, issued Jan. 28, 1986. Useful succinic acid builders include the $C_5$–$C_{20}$ alkyl and alkenyl succinic acids and salts thereof. A particularly preferred compound of this type is dodecenylsuccinic acid. Specific examples of succinate builders include: laurylsuccinate, myristylsuccinate, palmitylsuccinate, 2-dodecenylsuccinate (preferred), 2-pentadecenylsuccinate, and the like. Laurylsuccinates are the preferred builders of this group, and are described in European Patent Application 86200690.5/0,200,263, published Nov. 5, 1986.

Other suitable polycarboxylates are disclosed in U.S. Pat. No. 4,144,226, Crutchfield et al, issued Mar. 13, 1979 and in U.S. Pat. No. 3,308,067, Diehl, issued Mar. 7, 1967. See also Diehl U.S. Pat. No. 3,723,322.

Fatty acids, e.g., $C_{12}$–$C_{18}$ monocarboxylic acids, can also be incorporated into the compositions alone, or in combination with the aforesaid builders, especially citrate and/or the succinate builders, to provide additional builder activity. Such use of fatty acids will generally result in a diminution of sudsing, which should be taken into account by the formulator.

In situations where phosphorus-based builders can be used, the various alkali metal phosphates such as the well-known sodium tripolyphosphates, sodium pyrophosphate and sodium orthophosphate can be used. Phosphonate builders such as ethane-1-hydroxy-1,1-diphosphonate and other known phosphonates (see, for example, U.S. Pat. Nos. 3,159,581; 3,213,030; 3,422,021; 3,400,148 and 3,422,137) can also be used.

Polymeric soil release agents useful in the present invention also include cellulosic derivatives such as hydroxyether cellulosic polymers, copolymeric blocks of ethylene terephthalate or propylene terephthalate with polyethylene oxide or polypropylene oxide terephthalate, and the like. Such agents are commercially available and include hydroxyethers of cellulose such as METHOCEL (Dow). Cellulosic soil release agents for use herein also include those selected from the group consisting of $C_1$–$C_4$ alkyl and $C_4$ hydroxyalkyl cellulose; see U.S. Pat. No. 4,000,093, issued Dec. 28, 1976 to Nicol, et al.

Soil release agents characterized by poly(vinyl ester) hydrophobe segments include graft copolymers of poly (vinyl ester), e.g., $C_1$–$C_6$ vinyl esters, preferably poly(vinyl acetate) grafted onto polyalkylene oxide backbones, such as polyethylene oxide backbones. See European Patent Application 0 219 048, published Apr. 22, 1987 by Kud, et al. Commercially available soil release agents of this kind include the SOKALAN type of material, e.g., SOKALAN HP-22, available from BASF (West Germany).

One type of preferred soil release agent is a copolymer having random blocks of ethylene terephthalate and polyethylene oxide (PEO) terephthalate. The molecular weight of this polymeric soil release agent is in the range of from about 25,000 to about 55,000. See U.S. Pat. No. 3,959,230 to Hays, issued May 25, 1976 and U.S. Pat. No. 3,893,929 to Basadur issued Jul. 8, 1975.

Another preferred polymeric soil release agent is a polyester with repeat units of ethylene terephthalate units contains 10–15% by weight of ethylene terephthalate units together with 90–80% by weight of polyoxyethylene terephthalate units, derived from a polyoxyethylene glycol of average molecular weight 300–5,000. Examples of this polymer include the commercially available material ZELCON 5126 (from Dupont) and MILEASE T (from ICI). See also U.S. Pat. No. 4,702,857, issued Oct. 27, 1987 to Gosselink.

Another preferred polymeric soil release agent is a sulfonated product of a substantially linear ester oligomer comprised of an oligomeric ester backbone of terephthaloyl and oxyalkyleneoxy repeat units and terminal moieties covalently attached to the backbone. These soil release agents are described fully in U.S. Pat. No. 4,968,451, issued Nov. 6, 1990 to J. J. Scheibel and E. P. Gosselink. Other suitable polymeric soil release agents include the terephthalate polyesters of U.S. Pat. No. 4,711,730, issued Dec. 8, 1987 to Gosselink et al, the anionic end-capped oligomeric esters of U.S. Pat. No. 4,721,580, issued Jan. 26, 1988 to Gosselink, and the block polyester oligomeric compounds of U.S. Pat. No. 4,702,857, issued Oct. 27, 1987 to Gosselink.

Preferred polymeric soil release agents also include the soil release agents of U.S. Pat. No. 4,877,896, issued Oct. 31, 1989 to Maldonado et al, which discloses anionic, especially sulfoaroyl, end-capped terephthalate esters.

If utilized, soil release agents will generally comprise from about 0.01% to about 10.0%, by weight, of the detergent compositions herein, typically from about 0.1% to about 5%, preferably from about 0.2% to about 3.0%.

Chelating Agents—The detergent compositions herein may also optionally contain one or more iron and/or manganese chelating agents. Such chelating agents can be selected from the group consisting of amino carboxylates, amino phosphonates, polyfunctionally-substituted aromatic chelating agents and mixtures therein, all as hereinafter defined. Without intending to be bound by theory, it is believed that the benefit of these materials is due in part to their exceptional ability to remove iron and manganese ions from washing solutions by formation of soluble chelates.

Amino carboxylates useful as optional chelating agents include ethylenediaminetetracetates, N-hydroxyethylethylenediaminetriacetates, nitrilotriacetates, ethylenediamine tetraproprionates, triethylenetetraaminehexacetates, diethylenetriaminepentaacetates, and ethanoldiglycines, alkali metal, ammonium, and substituted ammonium salts therein and mixtures therein.

Amino phosphonates are also suitable for use as chelating agents in the compositions of the invention when at lease low levels of total phosphorus are permitted in detergent compositions, and include ethylenediaminetetrakis (methylenephosphonates) as DEQUEST. Preferred, these amino phosphonates to not contain alkyl or alkenyl groups with more than about 6 carbon atoms.

Polyfunctionally-substituted aromatic chelating agents are also useful in the compositions herein. See U.S. Pat. No. 3,812,044, issued May 21, 1974, to Connor et al. Preferred compounds of this type in acid form are dihydroxydisulfobenzenes such as 1,2-dihydroxy-3,5-disulfobenzene.

A preferred biodegradable chelator for use herein is ethylenediamine disuccinate ("EDDS"), especially the [S,S] isomer as described in U.S. Pat. No. 4,704,233, Nov. 3, 1987, to Hartman and Perkins.

If utilized, these chelating agents will generally comprise from about 0.1% to about 10% by weight of the detergent compositions herein. More preferably, if utilized, the chelating agents will comprise from about 0.1% to about 3.0% by weight of such compositions.

Polymeric Dispersing Agents—Polymeric dispersing agents can advantageously be utilized at levels from about 0.1% to about 7%, by weight, in the compositions herein, especially in the presence of zeolite and/or layered silicate builders. Suitable polymeric dispersing agents include polymeric polycarboxylates and polyethylene glycols, although others known in the art can also be used. It is believed, though it is not intended to be limited by theory, that polymeric dispersing agents enhance overall detergent builder performance, when used in combination with other builders (including lower molecular weight polycarboxylates) by crystal growth inhibition, particulate soil release peptization, and anti-redeposition.

Polymeric polycarboxylate materials can be prepared by polymerizing or copolymerizing suitable unsaturated monomers, preferably in their acid form. Unsaturated monomeric acids that can be polymerized to form suitable polymeric polycarboxylates include acrylic acid, maleic acid (or maleic anhydride), fumaric acid, itaconic acid, aconitic acid, mesaconic acid, citraconic acid and methylenemalonic acid. The presence in the polymeric polycarboxylates herein or monomeric segments, containing no carboxylate radicals such as vinylmethyl ether, styrene, ethylene, etc. is suitable provided that such segments do not constitute more than about 40% by weight.

Particularly suitable polymeric polycarboxylates can be derived from acrylic acid. Such acrylic acid-based polymers which are useful herein are the water-soluble salts of polymerized acrylic acid. The average molecular weight of such polymers in the acid form preferably ranges from about 2,000 to 10,000, more preferably from about 4,000 to 7,000 and most preferably from about 4,000 to 5,000. Water-soluble salts of such acrylic acid polymers can include, for example, the alkali metal, ammonium and substituted ammonium salts. Soluble polymers of this type are known materials. Use of polyacrylates of this type in detergent compositions has been disclosed, for example, in Diehl, U.S. Pat. No. 3,308,067, issued Mar. 7, 1967.

Acrylic/maleic-based copolymers may also be used as a preferred component of the dispersing/anti-redeposition agent. Such materials include the water-soluble salts of copolymers of acrylic acid and maleic acid. The average molecular weight of such copolymers in the acid form preferably ranges from about 2,000 to 100,000, more preferably from about 5,000 to 75,000, most preferably from about 7,000 to 65,000. The ratio of acrylate to maleate segments in such copolymers will generally range from about 30:1 to about 1:1, more preferably from about 10:1 to 2:1. Water-soluble salts of such acrylic acid/maleic acid copolymers can include, for example, the alkali metal, ammonium and substituted ammonium salts. Soluble acrylate/maleate copolymers of this type are known materials which are described in European Patent Application No. 66915, published Dec. 15, 1982, as well as in EP 193,360, published Sep. 3, 1986, which also describes such polymers comprising hydroxypropylacrylate. Still other useful dispersing agents include the maleic/acrylic/vinyl alcohol terpolymers. Such materials are also disclosed in EP 193,360, including, for example, the 45/45/10 terpolymer of acrylic/maleic/vinyl alcohol.

Another polymeric material which can be included is polyethylene glycol (PEG). PEG can exhibit dispersing agent performance as well as act as a clay soil removal-antiredeposition agent. Typical molecular weight ranges for these purposes range from about 500 to about 100,000, preferably from about 1,000 to about 50,000, more preferably from about 1,500 to about 10,000.

Polyaspartate and polyglutamate dispersing agents may also be used, especially in conjunction with zeolite builders. Dispersing agents such as polyaspartate preferably have a molecular weight (avg.) of about 10,000.

Brightener—Any optical brighteners or other brightening or whitening agents known in the art can be incorporated at levels typically from about 0.01% to about 1.2%, by weight, into the detergent compositions herein. Commercial optical brighteners which may be useful in the present invention can be classified into subgroups, which include, but are not necessarily limited to, derivatives of stilbene, pyrazoline, coumarin, carboxylic acid, methinecyanines, dibenzothiophene-5,5-dioxide, azoles, 5- and 6-membered-ring heterocycles, and other miscellaneous agents. Examples of such brighteners are disclosed in "The Production and Application of Fluorescent Brightening Agents", M. Zahradnik, Published by John Wiley & Sons, New York (1982).

Suds Suppressors—Compounds for reducing or suppressing the formation of suds can be incorporated into the compositions of the present invention. Suds suppression can be of particular importance in the so-called "high concentration cleaning process" and in front-loading European-style washing machines.

A wide variety of materials may be used as suds suppressors, and suds suppressors are well known to those skilled in the art. See, for example, Kirk Othmer Encyclopedia of Chemical Technology, Third Edition, Volume 7, pages 430–447 (John Wiley & Sons, Inc., 1979). One category of suds suppressor of particular interest encompasses monocarboxylic fatty acid and soluble salts therein. See U.S. Pat. No. 2,954,347, issued Sep. 27, 1960 to Wayne St. John. The monocarboxylic fatty acids and salts thereof used as suds suppressor typically have hydrocarbyl chains of 10 to about 24 carbon atoms, preferably 12 to 18 carbon atoms. Suitable salts include the alkali metal salts such as sodium, potassium, and lithium salts, and ammonium and alkanolammonium salts.

The detergent compositions herein may also contain non-surfactant suds suppressors. These include, for example: high molecular weight hydrocarbons such as paraffin, fatty acid esters (e.g., fatty acid triglycerides), fatty acid esters of monovalent alcohols, aliphatic $C_{18}$–$C_{40}$ ketones (e.g., stearone), etc.

Another preferred category of non-surfactant suds suppressors comprises silicone suds suppressors. This category includes the use of polyorganosiloxane oils, such as polydimethylsiloxane, dispersions or emulsions of polyorganosiloxane oils or resins, and combinations of polyorganosiloxane with silica particles wherein the polyorganosiloxane is chemisorbed or fused onto the silica. Silicone suds suppressors are well known in the art and are, for example, disclosed in U.S. Pat. No. 4,265,779, issued May 5, 1981 to Gandolfo et al and European Patent Application No. 89307851.9, published Feb. 7, 1990, by Starch, M. S.

Dye Transfer Inhibiting Agents—The compositions of the present invention may also include one or more materials effective for inhibiting the transfer of dyes from one fabric to another during the cleaning process. Generally, such dye transfer inhibiting agents include polyvinyl pyrrolidone polymers, polyamine N-oxide polymers, copolymers of N-vinylpyrrolidone and N-vinylimidazole, manganese phthalocyanine, peroxidases, and mixtures thereof. If used, these agents typically comprise from about 0.01% to about 10% by weight of the composition, preferably from about 0.01% to about 5%, and more preferably from about 0.05% to about 2%.

Further Processing

The "pastilles" or "micropastilles" may be dusted with a fine powder in order to improve their flow properties. Suitable powders are crystalline or amorphous aluminosilicates, especially Zeolite A; crystalline or amorphous silica, clay, talc.

Finally the finished "pastilles" or "micropastilles" are preferably combined with other commonly used detergent components to form a finished detergent composition. Other detergent components include detergent builders, enzymes, bleach, such perborate or percarbonate, bleach activators, polymeric soil release agents, chelating agents, clay soil removal agents, polymeric dispersing agents, suds suppressing agents, optical brightener, perfume (such as those described in detail on pages 19 to 45 of WO92/06160).

EXAMPLES

C16–C18 N-methyl glucamide (NMG) is synthesised with ethoxylated nonionic surfactant (average of 5 moles of ethylene oxide per mole of C12–C14 alcohol, AE5) present during the reaction of methyl ester and N-methyl glucamine as described in WO92/06160. The nonionic surfactant acts as a melting point depressor which allows the reaction to be run without forming cyclic glucose amides which are undesirable. The surfactant mixture obtained is then mixed with other detergent components.

The resulting surfactant paste had the following composition:

| | Ex. 1 wt % | Ex. 2 wt % | Ex. 3 wt % | Ex. 4 wt % |
|---|---|---|---|---|
| Ethoxylated nonionic surfactant (AE5) | 20 | 30 | 27 | 15 |
| C12–C14 N-methyl glucamide (12–14NMG) | 47 | 35 | 63 | — |
| C16–C18 N-methyl glucamide (16–18NMG) | — | 35 | — | 35 |
| C12–C16 alkyl sulphate (AS), 100% active powder | 33 | — | — | — |
| C12–C16 alkyl sulphate (AS), 80% active aqueous paste | — | — | — | 50 |
| Hydrogenated Fatty Acid (Hyfac) | — | — | 10 | — |

| | Ex. 6 wt % | Ex. 7 wt % | Ex. 8 wt % | Ex. 9 wt % |
|---|---|---|---|---|
| Ethoxylated nonionic surfactant (AE5) | 30 | 20 | 25 | 10 |
| Alkyl polyglycoside | 70 | — | — | 80 |
| C12–C14 N-methyl glucamide (12–14NMG) | — | 47 | 55 | — |
| Secondary alkyl sulphate (SAS) | — | 33 | — | — |
| Anionic surfactant | — | — | 20 | — |
| C12–C16 alkyl sulphate (AS), 80% active aqueous paste | — | — | — | 10 |

The anionic surfactant in example 9 is selected alternatively from C13–15 alkyl sulphate (with an average of 6 ethoxy groups per molecule), AE6S; oleoyl sarcosinate; alkyl glycoside, LAS, or methyl ester sulphate. The anionic surfactant of example 9 was also replaceable by cationic surfactant; and with a 50:50 mix of cationic surfactant with LAS.

| | Ex. 10 wt % | Ex. 11 wt % | Ex. 12 wt % | Ex. 13 wt % |
|---|---|---|---|---|
| Ethoxylated nonionic surfactant (AE5) | 60 | 25 | 25 | 15 |
| C12–C14 N-methyl glucamide (12–14NMG) | — | 55 | 55 | 35 |
| C12–C16 alkyl sulphate (AS), 80% active aqueous paste | 20 | — | — | 10 |
| Polymer | 20 | 20 | 10 | 7 |
| Detergent powder | — | — | 10 | 15 |
| Hydrogenated Fatty Acid (Hyfac) | — | — | — | 10 |
| Minors | — | — | — | 8 |

In examples 10 to 13, the polymer used is alternately PVP, PVNO, PVPVI, polyaspartic acid, terpolymer, acrylic-maleic copolymer, soil release polymer, polyethylene glycol or polyethylene oxide.

The detergent powder of example 12 and 13 is alternately silica, zeolite, amorphous silicate, crystalline silicate, smectite clay, carbonate, bicarbonate, citrate or citric acid.

The minors of example 13 are detergent enzymes (5 parts), perfume (1 part), brightener (1 part), together with 1 part of either phosphonate or EDDS.

| | Ex. 14 wt % | Ex. 15 wt % | Ex. 16 wt % | Ex. 17 wt % |
|---|---|---|---|---|
| Ethoxylated nonionic surfactant (AE5) | 20 | 20 | 20 | 20 |
| C12–C14 N-methyl glucamide (12–14NMG) | 40 | 40 | 40 | 40 |
| C12–C16 alkyl sulphate (AS), 80% active aqueous paste | 10 | 10 | 10 | 10 |
| Polymer | 3 | 3 | 3 | 3 |
| Silicate | — | — | — | 5 |
| Sodium carbonate | 5 | 10 | 10 | 5 |
| Sodium perborate | 10 | — | 10 | — |
| Sodium percarbonate | — | 10 | — | 10 |
| Tetraacetyl ethylene diamine (TAED) | 5 | 5 | 5 | 5 |
| Minors | 7 | 2 | 2 | 2 |

In examples 14 to 17, the polymer used are alternately PVP, PVNO, PVPVI, polyaspartic acid, terpolymer, acrylic-maleic copolymer, soil release polymer, polyethylene glycol or polyethylene oxide.

The minors of example 14 are detergent enzymes (5 parts), perfume (1 part), phosphonate (1 part); the minors of examples 15 to 17 are 1 part of phosphonate and 1 part of EDDS.

The silicate of example 17 is either crystalline or amorphous silicate.

| | Ex. 18 wt % | Ex. 19 wt % | Ex. 20 wt % | Ex. 21 wt % |
|---|---|---|---|---|
| Ethoxylated nonionic surfactant (AE5) | 20 | 25 | 20 | 20 |
| C12–C14 N-methyl glucamide (12–14NMG) | 50 | 50 | 50 | 50 |
| C12–C16 alkyl sulphate (AS), 80% active aqueous paste | 10 | 15 | 15 | 15 |
| Tetraacetyl ethylene diamine (TAED) | 20 | — | — | — |
| Minors | — | 10 | — | — |
| Polyaspartic acid | — | — | 15 | — |
| Chelant | — | — | — | 15 |

The minors of example 19 are alternately detergent enzymes, brighteners or perfume.

The chelant of example 21 is either phosphonate or ethylene diamine disuccinate (EDDS).

In any of Examples 1 to 21, the AE5 can be replaced with, for example, ethoxylated nonionic surfactant having an average of 3 moles of ethylene oxide per mole of C12–C15 alcohol, AE3; or with nonionic surfactant having an average of 7 moles of ethylene oxide per mole of C13–C15 alcohol, AE7.

In any of Examples 1 to 3, 7, 8 and 11 to 21, the C12–14 NMG can be replaced with, for example, C16–18 NMG; or by C16–18 N-butylglucamide.

| | Ex. 22 wt % | Ex. 23 wt % | Ex. 24 wt % | Ex. 25 wt % |
|---|---|---|---|---|
| Ethoxylated nonionic surfactant (AE5) | 21.6 | 16.8 | 21.6 | 16.8 |
| C12–C14 N-methyl | 50.4 | 39.2 | 50.4 | 39.2 |

-continued

| | | | | |
|---|---|---|---|---|
| glucamide (12–14NMG) | | | | |
| fatty acid | 18 | 14 | 18 | 14 |
| Sodium sulphate | 10 | 30 | | |
| Citric acid | | | 10 | 30 |

| | Ex. 26 wt % | Ex. 27 wt % | Ex. 28 wt % |
|---|---|---|---|
| Ethoxylated nonionic surfactant (AE5) | 24 | 21 | 24 |
| C12–C14 N-methyl glucamide (12–14NMG) | 56 | 49 | 56 |
| fatty acid | | 30 | 20 |
| Sodium carbonate | 20 | | |

Paste compositions are prepared according to the Examples 1 to 28 by mixing the components. In each example, the paste is then pumped to a Rotoform® manufactured by Sandvik Conveyor GmbH. Using this equipment drops of surfactant paste are formed on a stainless steel conveyor belt, each drop having a diameter of approximately 1 mm. The underside of the conveyor belt is cooled by spraying on a chilled water/glycol mixture. The solidified pastilles are then removed from the belt and dusted with from 2 to 5 parts by weight of Zeolite A in a drum mixer.

In all of these examples the bulk density of the finished pastillated composition is about 450 g/l.

What is claimed is:

1. A process for the manufacture of detergent compositions from a surfactant paste which is substantially in the solid phase at temperatures of 25° C. and below comprising the steps of:

(i) mixing the surfactant paste at a temperature above its softening point, the surfactant paste consisting essentially of at least 50% by weight of nonionic surfactant and an anionic surfactant selected from the group consisting of alkyl benzene sulfonates, alkyl sulfates, alkyl alkoxy sulfates, alkyl alkoxy carboxylates, sulfated polyglycosides and oleyl sarcosinates, wherein the weight ratio of the anionic surfactant to the nonionic surfactant is from 1:100 to 1:1;

(ii) forming the molten surfactant paste into drops on a cooling surface;

(iii) forming solid pastilles by cooling the drops of molten surfactant paste; and (iv) removing solidified pastilles from the cooling surface.

2. A process according to claim 1 wherein the surfactant paste has a water component of less than 15% by weight of the surfactant paste.

3. A process according to claim 2 wherein the surfactant paste has a water component of less than 10% by weight of the surfactant paste.

4. A process according to claim 1 wherein said nonionic surfactants are selected from the group consisting of ethoxylated nonionic surfactants, glycerol ethers, glucosamides, glycerol amides, glycerol esters, fatty acid esters, fatty amides, alkyl polyglycosides, alkyl polyglycol ethers, ethoxylated alkyl phenols and mixtures thereof.

5. A process according to claim 4 wherein said nonionic surfactant is a mixture of polyhydroxy fatty acid amide and an ethoxylated nonionic surfactant in a weight ratio of from 3:7 to 7:3.

6. A process according to claim 1 wherein the surfactant paste further consists essentially of other non-surfactant detergent ingredients selected from the group consisting of polymeric and oligomeric materials and mixtures thereof.

7. A process according to claim 6 wherein the polymeric materials are selected from the group consisting of polymeric carboxylates, polyethylene glycols, polyaspartates, polyglutamates, and mixtures thereof.

8. A process according to claim 1 wherein the molten surfactant paste is formed into drops by a continuous rotary drop former comprising outer and inner coaxial cylinders, both cylinders comprising a series of openings, at least one of the cylinders being rotatable.

9. A process according to claim 8 wherein the molten surfactant drops are formed on a continuous steel cooling belt.

10. A process according to claim 9 wherein the molten surfactant drops are cooled by spraying a cooling liquid on to the opposite side of the belt to the side on which the drops are formed.

* * * * *